(12) United States Patent
Hyckenberg et al.

(10) Patent No.: US 12,448,659 B2
(45) Date of Patent: Oct. 21, 2025

(54) METHOD IN BIOPROCESS PURIFICATION SYSTEM

(71) Applicant: Cytiva Sweden AB, Uppsala (SE)

(72) Inventors: Key Hyckenberg, Uppsala (SE); Helena Skoglar, Uppsala (SE); Gunnar Malmquist, Uppsala (SE); Mikael Carlsten, Uppsala (SE); Roger Lundqvist, Uppsala (SE); Dan Andersson, Uppsala (SE); Linda Mathiasson, Uppsala (SE); Lars Mattsson, Uppsala (SE); Sara Sendabo, Uppsala (SE); Mikael Berg, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 1240 days.

(21) Appl. No.: 17/253,067

(22) PCT Filed: Jul. 1, 2019

(86) PCT No.: PCT/EP2019/067643
§ 371 (c)(1),
(2) Date: Dec. 16, 2020

(87) PCT Pub. No.: WO2020/002713
PCT Pub. Date: Jan. 2, 2020

(65) Prior Publication Data
US 2021/0269888 A1    Sep. 2, 2021

(30) Foreign Application Priority Data
Jun. 29, 2018    (GB) ...................... 1810772

(51) Int. Cl.
*C12Q 3/00* (2006.01)
*C12M 1/00* (2006.01)
*C12M 1/34* (2006.01)
*C12M 1/36* (2006.01)

(52) U.S. Cl.
CPC ............... *C12Q 3/00* (2013.01); *C12M 29/10* (2013.01); *C12M 41/12* (2013.01); *C12M 41/42* (2013.01); *C12M 41/48* (2013.01); *C12M 47/12* (2013.01)

(58) Field of Classification Search
None
See application file for complete search history.

(56) References Cited

U.S. PATENT DOCUMENTS

| | | | |
|---|---|---|---|
| 4,802,981 A | 2/1989 | Kenney et al. | |
| 9,045,724 B2 | 6/2015 | Roux Dit Buisson | |
| 10,551,363 B2 | 2/2020 | Yanagisawa | |
| 10,830,740 B2 | 11/2020 | Gebauer | |
| 2002/0155541 A1 | 10/2002 | Naughton et al. | |
| 2007/0215534 A1 | 9/2007 | Thommes et al. | |
| 2012/0091063 A1 | 4/2012 | Bangtsson et al. | |
| 2013/0144542 A1 | 6/2013 | Ernst et al. | |
| 2013/0260419 A1* | 10/2013 | Ransohoff ......... B01D 15/3804 435/69.6 |
| 2013/0280788 A1 | 10/2013 | Skudas | |
| 2014/0033793 A1 | 2/2014 | Thorson et al. | |
| 2014/0299547 A1 | 10/2014 | Muller-Spath et al. | |
| 2017/0204446 A1 | 7/2017 | Cattaneo et al. | |
| 2020/0378934 A1 | 12/2020 | Bangtsson et al. | |

FOREIGN PATENT DOCUMENTS

| | | |
|---|---|---|
| CN | 101076347 A | 11/2007 |
| CN | 102824758 A | 12/2012 |
| CN | 204649698 U | 9/2015 |
| CN | 106687575 A | 5/2017 |
| CN | 107532132 A | 1/2018 |
| CN | 110325853 A | 10/2019 |
| EP | 2267168 A1 | 12/2010 |
| GB | 2362000 A | 11/2001 |
| JP | 2013514804 A | 5/2013 |
| JP | 2016133487 A | 7/2016 |
| JP | 2016532457 A | 10/2016 |
| JP | 2017515501 A | 6/2017 |
| JP | 2017519497 A | 7/2017 |
| WO | 2006/039588 A2 | 4/2006 |

(Continued)

OTHER PUBLICATIONS

Office Action Issued in U.S. Appl. No. 16/474,412, mailed Aug. 29, 2022.

(Continued)

*Primary Examiner* — Teresa E Knight
(74) *Attorney, Agent, or Firm* — Eversheds-Sutherland (US) LLP (57) ABSTRACT

The present invention relates to a method for optimizing a bioprocess purification system comprising a bioreactor configured to provide a harvest comprising a target composition, and a purification process arranged downstream the bioreactor and being configured for purification of the harvest to produce a target product having a desired characteristics. The method comprising: a) detecting (32) at least one quality attribute indicative of characteristics of the target product in a downstream process, b) identifying (33) correlations between the at least one quality attribute measured in the downstream process and parameters to control a cell culture process in the bioreactor, and c) controlling (34) the cell culture process to meet the desired characteristics based on the identified correlations, whereby the target characteristics is within a p re-determined range.

6 Claims, 4 Drawing Sheets

(56) References Cited

FOREIGN PATENT DOCUMENTS

| WO | 2011/057380 | A1 | | 5/2011 | | |
|---|---|---|---|---|---|---|
| WO | 2011/113924 | A1 | | 9/2011 | | |
| WO | WO-2015188009 | A1 | * | 12/2015 | ............ | C07K 16/00 |
| WO | 2018/122196 | A1 | | 7/2018 | | |

OTHER PUBLICATIONS

CN Office Action Issued in corresponding CN Patent Application No. 201980043516.5, issued Oct. 28, 2023, 20 pages.
Yi, Xiaoping, "PAT and on-line biological detection technology for animal cell culture", Biotechnology and Business, vol. 1, pp. 33-40, Jan. 31, 2018. (Abstract).
Chinese Office Action for CN Application No. 201780087604.6 mailed Jun. 21, 2021 (23 pages, with English translation).
JP Office Action Issued in corresponding JP Patent Application No. 2020-572782, mailed May 15, 2023, 6 pages.
Lienqueo, et al., "Use of expert systems for the synthesis of downstream protein processes"; Computers and Chemical Engineering, 2000, vol. 24, pp. 2339-2350.
Japanese Office Action for JP Application No. 2019-535842 mailed Aug. 30, 2021 (5 pages, with English translation).
PCT International Search Report and Written Opinion for PCT/EP2019/067643 mailed Oct. 9, 2019 (12 pages).
Great Britain Search Report for GB Application No. 1810772.2 mailed Dec. 27, 2018 (4 pages).
Restriction Requirement for U.S. Appl. No. 16/474,412 mailed Dec. 14, 2020 (7 pages).

* cited by examiner

METHOD IN BIOPROCESS PURIFICATION SYSTEM

CROSS REFERENCE TO RELATED APPLICATIONS

This application claims the priority benefit of PCT/EP2019/067643, filed on Jul. 1, 2019, which claims the benefit of Great Britain Application No. 1810772.2, filed on Jun. 29, 2018, the entire contents of which are incorporated by reference herein.

TECHNICAL FIELD

The present invention relates to a method for controlling a bioprocess purification system for purification of a target product from a bioreactor system.

BACKGROUND

The quality of the material produced in the bioreactor (in cell culture system) is important in order to achieve a reliable, robust and economic manufacturing procedure when purifying the harvest from a bioreactor.

Currently, the quality of the material from the bioreactor may be measured using using on-line techniques (e.g. Raman spectroscopy) or by analysing off-line samples and the quality of the cell culture produced in the bioreactor may be optimized.

However, the cell culture process may be optimized without any indication that a suitable result is achieved in the downstream process (e.g. before, during or after the capture step).

Thus, there is a need to introduce a process for optimizing the cell culture process to achieve the desired outcome of the target product in real time.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

The object is achieved by a method for optimizing a bioprocess purification system comprising a bioreactor configured to provide a harvest comprising a target composition, and a pruification arrangement downstream the bioreactor and being configured for purification of the harvest to produce a target product having a desired characteristics. The method comprising: a) detecting at least one quality attribute indicative of characteristics of the target product in a downstream process, b) identifying correlations between at least one quality attribute measured in the downstream process and parameters to control a cell culture process in the bioreactor, and c) controlling the cell culture process to meet the desired characteristics based on the identified correlations, whereby the target characteristics is within a pre-determined range.

An advantage is that the quality of the target product is improved.

Further objects and advantages may be obtained from the detailed description by a skilled person in the art.

DETAILED DESCRIPTION

A bioprocess purification system is designed for production and purification of target products (such as proteins, biomolecules from cell culture/fermentation, natural extracts) by growing cells capable of expressing the target product in a cell culture bioreactor followed by a downstream purification process (also referred to as Downstream process) for purifying the target product. In embodiments of the present invention, the downstream purification process may be any suitable process capable of providing a purified target product, the process may comprise one or multiple steps. One commonly used step in a downstream purification process is chromatography. In particular the current invention relates to a bioprocess purification system arranged to produce and provide a purified target product during an extended period of time where the target product is harvested from the bioreactor and purified by the downstream purification process while the cell culture is maintained. This type of cell culture is herein referred to as "continuous cell culture process" and examples of such cell cultures includes perfusion cell culture and chemostat cell culture.

Figure 1:
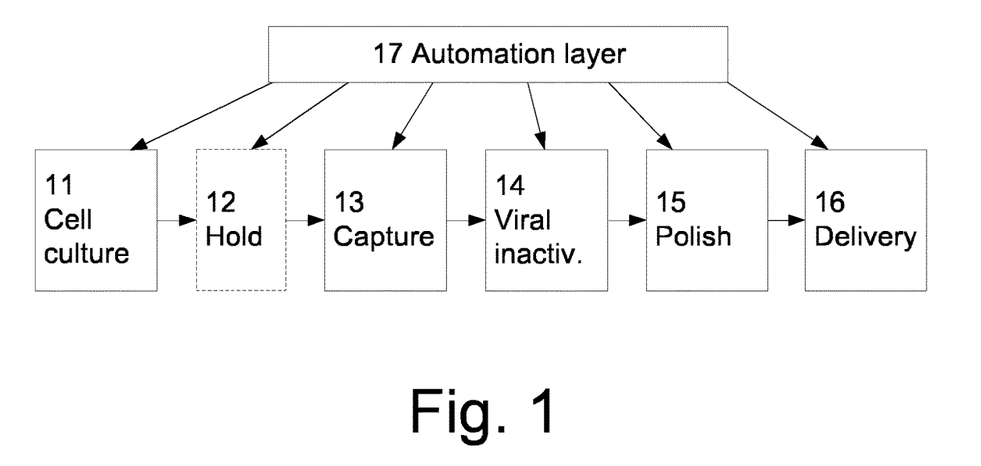
FIG. 1 illustrates an overview of a bioprocess purification system designed to purify a target product from a harvest fluid from a bioreactor.

In FIG. 1, an overview of a bioprocess purification system according to one embodiment, configured to purify a target product using a separation process is shown. The bioprocess purification system comprises a number of steps related to Cell culture 11, Hold 12, Capture 13, Viral inactivation 14, Polish 15 and Delivery 16.

In the disclosed embodiment of the present invention the cell culture step 11 may be a continuous cell culture process which comprises of continuous addition of nutrients and continuous removal of product and waste over an extended period of time (harvest). The process can either be operated in perfusion retaining the cells in the bioreactor by e.g. using an Alternate Tangential Filtration (ATF) device. Alternatively, the bioreactor is operated without cell retention, i.e. a chemostat. The cell culture step may comprise process control for viable cell density (VCD), but also nutrients and metabolites. The VDC, productivity and product quality may be controlled by adapting the components of the cell culture media fed to the culture or by addition of certain components directly to the culture, as described in more detail below.

In some embodiments, the harvest containing the target product may be clarified before feeding the harvest to the downstream purification process, e.g. by filtration, centrifugation or another technique.

The hold step 12 is an optional step depending on process needs, e.g. if a filter is in-line before capture step 13. The step may comprise process control on weight, and the next step in the process starts when a pre-determined volume value is reached, or alternatively after a certain time period or when a pre-determined mass is reached. The hold step may be used for collecting a volume of filtered feed from a perfusion cell culture.

In the disclosed embodiment, the downstream purification process comprises three steps Capture 13, Viral inactivation 14 and Polish 15. The capture step 13 may comprise a continuous chromatography process (as explained in more detail below) or a semi-continuous chromatography process. The semi-continuous chromatography involves repeated batch chromatography steps over time being supplied by batches of harvest from the cell culture step 11, directly or via the hold step 12, containing the target product. A filter may be provided in-line before the capture step. The continuous chromatography may be run as periodic counter current chromatography (as described more in detail in the copending applications PCT/EP2017/084495 and PCT/EP2017/084478 which are hereby incorporated by reference) with a continuous feed of harvest from the cell culture step 11, directly or via the hold step 12, containing the target product. The capture step comprises multiple batch elutions, and process control e.g. using in-line UV-sensors handles variation in feed concentration and resin capacity. The next step starts when a pre-determined amount value (e.g. volume, mass or time) is reached.

In the viral inactivation step 14, different options for virus inactivation is available depending on process needs. One option is to use batch mode with low pH for 30-60 minutes in a hold up tank. The step may comprise process control on volume, time, temperature and pH. The next step starts when a pre-determined time is reached.

The polish step 15 may be straight through processing (STP) with a connected batch step or continuous chromatography with a continuous load step, or a combination thereof. The flow rate is adjusted to perfusion rate required by producer cells, which means that the flow rate is determined by the preceding step. The step may comprise process control for UV, flow and volume, and the next step starts when a pre-determined volume and amount is reached, alternatively when a timeout is reached.

The delivery step 16 may comprise a virus removal step, e.g. a viral filter, before an ultra-filtration step. The delivery step may be used as concentration step for batch addition of processed harvest from polish step. The delivery step 16 may comprise continuous or batch delivery of product and may comprise continuous or batch removal of waste. The step may comprise process control for pH, conductivity, absorbance, volume and pressure, and delivery is achieved when a pre-determined product concentration in a pre-defined environment is reached.

An automation layer 17 is used for handling decision points for next step in the process. Different type of sensors (not shown), both in-line sensors and off-line sensors, are integrated into the process flow to monitor different parameters that may be used for providing the automation layer 17 with data that could be used to handle the decision points. Sensors include but are not limited to only measure flow, VCD, weight, pressure, UV, volume, pH, conductivity, absorbance, etc.

It should be noted that UV absorbtion is an example of a parameter that could be monitored to detect the composition of the harvest being purified. However, other parameters may be used operating in other frequency ranges, such as IR, fluorescence, x-rays, etc.

The product quality of the target product produced in a bioprocess purification system may be improved by obtaining information related to the target product during the process run, or the produced target product itself. Attributes relevant to product quality have to be measured, and different analytic methods may be used such as Mass Spectroscopy, MS, Light Scattering, Size Exclusion Chrom, SEC, Raman spectroscopy, etc.

The cell culture system comprises a bioreactor that produces a harvest containing the target product and the cell culture process may be controlled to optimize the product quality of the target product. Examples of parameters that may be controlled in the bioreactor is temperature, aeration, agitation etc.

Figure 2:
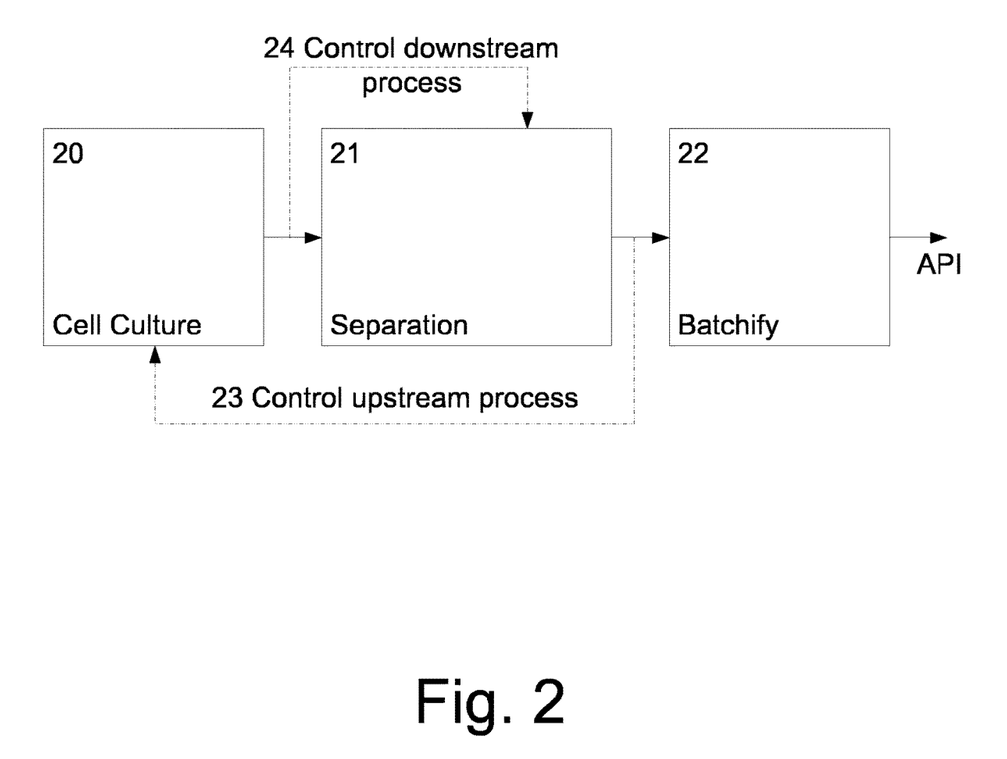
FIG. 2 illustrates the concept of controlling upstream/downstream processes in a bioprocess purification system.

FIG. 2 illustrates the concept of controlling upstream/downstream processes in a bioprocess purification system. The illustration of the bioprocess purification system is simplified and comprises three steps: Cell culture 20, Separation 21 and batchify 22. The target product (in this example exemplified by "active pharmaceutical ingredient"—API) is delivered after the batchify step.

The Cell culture step 20 is a continuous cell culture process as described above that includes continuous addition of nutrients to e.g a cell perfusion process with continuous harvest of target product and waste. The target product and waste is considered to be the harvest that is fed into the Separation step 21 which may include one or more steps of a downstream purification process. The separation step comprises a process for at least partly separating the target product from the waste in the harvest and the target product is forwarded to the final step Batchify 22, in which the target product is handled to be ready for delivery as API.

After the separation step, certain parameters, or quality attributes, may be measured, e.g. composition of impurities in target product or amount of fragments or aggregates of the target product using mass spectrometer, MS, or spectrometry. This information may be used to control an upstream process 23. For instance, if a high amount of degraded target product is detected after separation, this may be counteracted by changing parameters in the cell culture step, e.g byan increased flow rate of medium into the bioreactor to prevent degradation of target product molecules before introduced into the separation step 21. Alternatively, feeding of nutrients or process parameters in the cell culture may be adjusted based on the measured quality attributes, as described in more detail below.

The same concept may be used to control a downstream process 24. The concentration of target product in the harvest being fed into the separation step 21 may be determined by measuring the time to load each column and the peak amount of target product after elution. This information may be used to adjust the elution based on the concentration of target product in the harvest being fed into the separation step.

Figure 5:
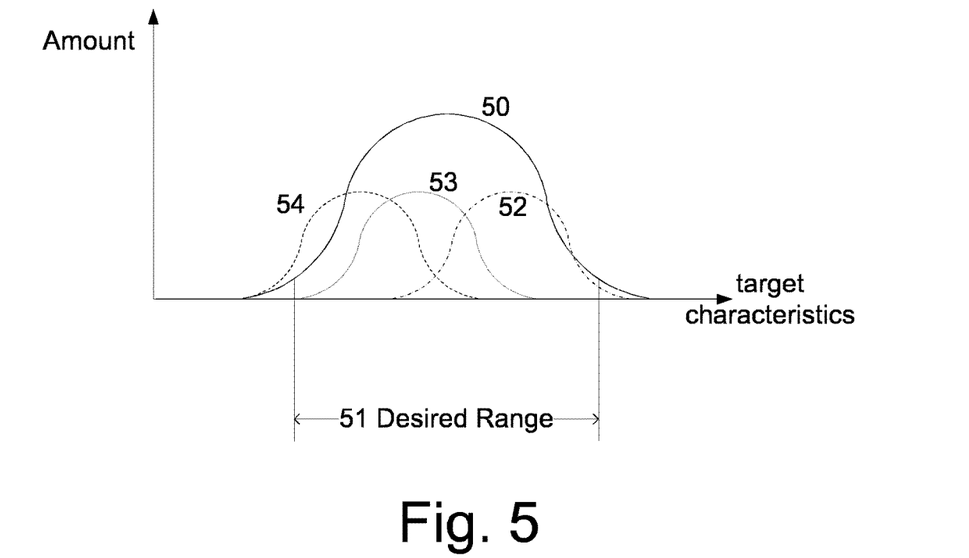
FIG. 5 illustrates load volume data used for trend analysis.

FIG. 5 illustrates real time trend analysis used to ensure desired target characteristics. Curve 50 illustrates the desired distribution of a selected target characteristics, for instance impurities, concentration, virus, etc. A pre-determined range 51 is selected based on the selected target characteristics 50. In order to be able to monitor the characteristics of the target product continuously, a process is suggested in which batches are created from the continuous flow, when using a continuous chromatography process, and each batch is evaluated and quality controlled to ensure that each batch fulfil the specification of the target product. For a semi-continuous chromatography process, batches are produced.

The dot-dashed curve 52 illustrates the measurements of the selected target characteristics of a first batch. The first batch is decided to be within the pre-determined range. The dotted curve 53 illustrates the measurements of the selected target characteristics of a second batch. The second batch is decided to be within the pre-determined range. The dashed curve 54 illustrates the measurements of the selected target characteristics of a third batch. The third batch is decided not to be within the pre-determined range and is thus forwarded to waste.

Figure 3:
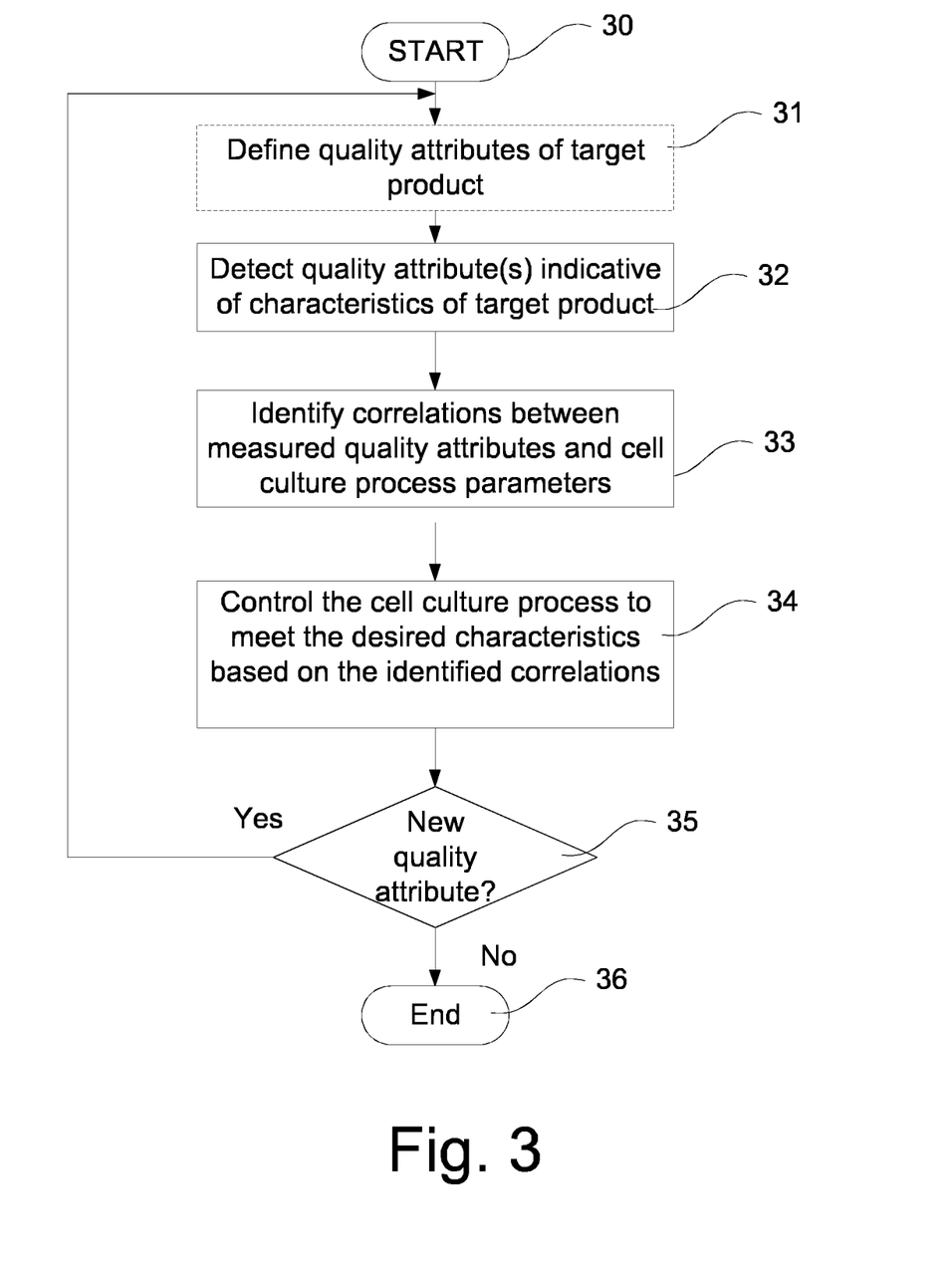
FIG. 3 illustrates a process for controlling characteristics of a target product in bioprocess purification system.

FIG. 3 illustrates a method for controlling a bioprocess purification system comprising a downstream purification process configured for purification on a harvest comprising a target product having a desired characteristics. A bioreactor is controlled by a cell culture process and supplies the harvest to the downstream purification process m. It should be noted that the bioreactor is configured to supply harvest over one or more chromatography batches in a semi-continuous chromatography process.

The method starts in step 30 and comprises three main steps: detecting 32 at least one quality attribute indicative of characteristics of the target product in a downstream process, identifying 33 correlations between the at least one measured quality attribute in the downstream process and parameters to control the cell culture process, and controlling 34 the cell culture process, to meet the desired characteristics of the target product based on the identified correlations, whereby the target characteristics is within a pre-determined range.

Optionally, a step to define 31 at least one quality attribute is performed before the three main steps are initiated. According to one aspect, the at least one quality attribute is defined by analysing readings from at least one sensor arranged downstream the bioreactor to obtain readings related to the quality attributes. Different types of analytic methods may be used to obtain these readings, such as Mass Spectroscopy, MS, Light Scattering, Size Exclusion Chrom, SEC, Rahman, etc.

The control of the cell culture process in 34 comprises controlling an upstream process, and according to one aspect the control of the upstream process comprises controlling the concentration of the target product in the harvest being fed into the downstream process. In addition, the control of an upstream process further comprises controlling the cell culture process to adjust the composition of the harvest being fed into the downstream process.

The method described in connection with FIG. 3 may be implemented in a bioprocess purification system comprising downstream process comprising chromatography process, either a semi-continuous chromatography process configured for repeated batch process or a continuous chromatography process configured to operate with at least two columns in a cyclic operation for continuous purification. The purification is performed on a harvest comprising a target product having a desired characteristics as disclosed in connection with FIGS. 1 and 4.

The bioprocess purification system is configured to detect at least one quality attribute indicative of characteristics of the target product, identify correlations between the measured quality attributes of the downstream process and cell culture process parameters, and control the bioprocess purification system to meet the desired characteristics based on the identified correlations, whereby the target characteristics is within a pre-determined range.

According to some embodiments, the bioprocess purification system is further configured to control the concentration of the target product in the harvest being fed into the downstream process. According to some embodiments, the bioprocess purification system is further configured to control the cell culture process to adjust the composition of the harvest being fed into the downstream process.

According to some embodiments, the continuous cell culture process and the bioprocess purification system is further configured to control temperature and/or aeration and/or agitation.

According to some embodiments, the bioprocess purification system is further configured to analyse readings from at least one sensor arranged downstream the bioreactor to obtain readings related to the quality attributes. According to some embodiments, the bioprocess system is further configured to use analytic methods from any of the group: Mass Spectroscopy, MS, Light Scattering, Size Exclusion Chrom, SEC, Rahman, when analysing readings from the at least one sensor.

The method described above may be implemented in a computer program for controlling a bioprocess purification system. The computer program comprises instructions which, when executed on at least one processor, cause the at least one processor to carry out the method according to the different variations described in connection with FIG. 3. The computer program for controlling the bioprocess purification system may be stored on and carried by a computer readable storage medium.

In the following, a specific embodiment is disclosed, related to a method for controlling a bioprocess purification system for producing a target product having a desired characteristics, the bioprocess purification system comprising at least one upstream process in the form of a continuous cell culture process and a downstream process, which may be a continuous chromatography process or a semi-continuous chromatography process or the like. The at least one upstream process comprises a continuous cell culture process for producing a feed (or harvest) comprising the target product. The continuous chromatography process is configured to operate with at least two columns and is configured for continuous purification in a cyclic operation, wherein the continuous purification is performed on the feed to separate the target product from other components of the feed. The semi-continuous chromatography process is configured to operate in a repeated batch mode for purifying the harvest from the continuous cell culture process, which may be a perfusion type cell culture in a bioreactor, wherein the method comprising:
  a) detecting, after at least partial purification of the target product, at least one quality attribute indicative of characteristics of the target product, and/or after removal of the target product from the feed at least one quality attribute indicative of the characteristics of the feed (for instance amount of impurities),
  b) controlling at least one upstream process in response to the detected at least one quality attribute to produce the target product having said desired characteristics.

All information that may be linked to cell culture conditions can be used to loop back system controlled measures such as pH adjustment or addition or reduction of the carbon source, vitamins, trace elements, etc. In particular, a cell culture simulation model may be used to predict what output is expected from a given action.

Figure 4:
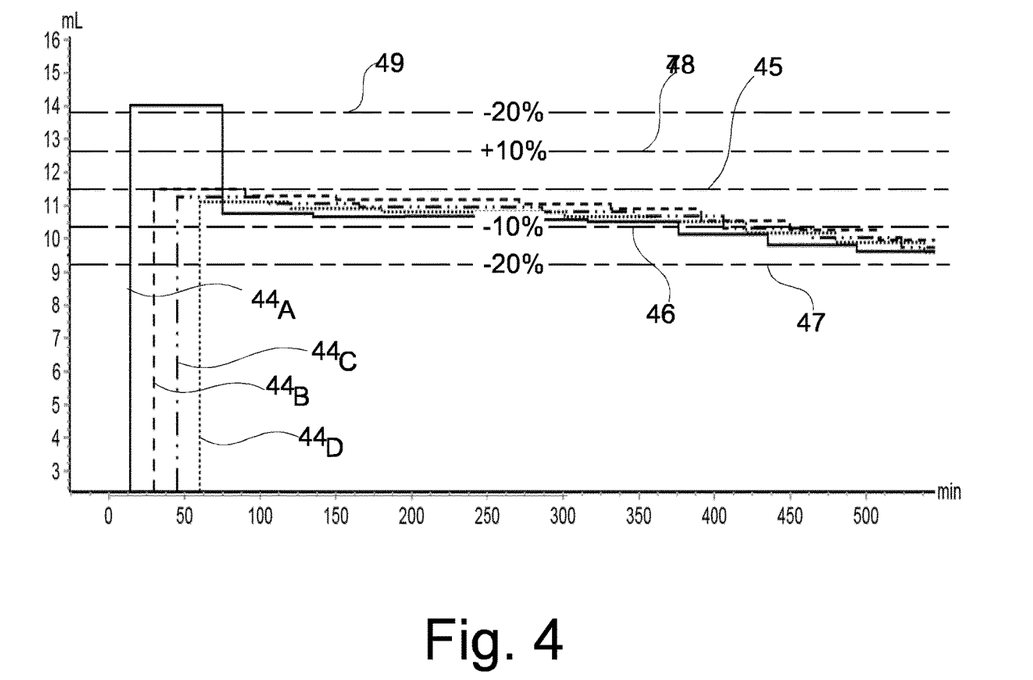
FIG. 4 illustrates data used for trend analysis.

An embodiment using a continuous chromatography process having four columns A-D, is exemplified in FIG. 4, which is a graph illustrating loading volume of harvest (y axis) into each column A-D over run time (x axis). The solid line 44$_A$ is the measured loading volume for column A, and the curve is amount is adjusted in steps approximately every 60 minutes. The same applies for column B (dashed line 44$_B$), column C (double dot-dashed line 44$_C$) and column D (dotted line 44$_D$).

Different boundary conditions (lines 45-49) are indicated in the graph, which may be used to identify trends that indicate a deviating behaviour. If, for instance, the loading volume is more than 20% higher than the expected level (as indicated by 45) immediate action is required to maintain proper functionality in the system. This is illustrated for column A, which exceeds the +20% level (as indicated by 49) after the first cycle. This may be an indication that the concentration of target product in the harvest fed into the column is too low. However, this is only shown for column A during the first cycle and may be a result of the start-up process.

Apart from the first cycle for column A, all curves $44_A$-$44_D$ show the same behaviour, which is a steady declining behaviour and after 7-8 cycles, the lower warning level (as indicated by 46) is passed and this indicate that the concentration of target product in the harvest is increasing. Action may be needed to ensure proper functionality.

Figure 6:
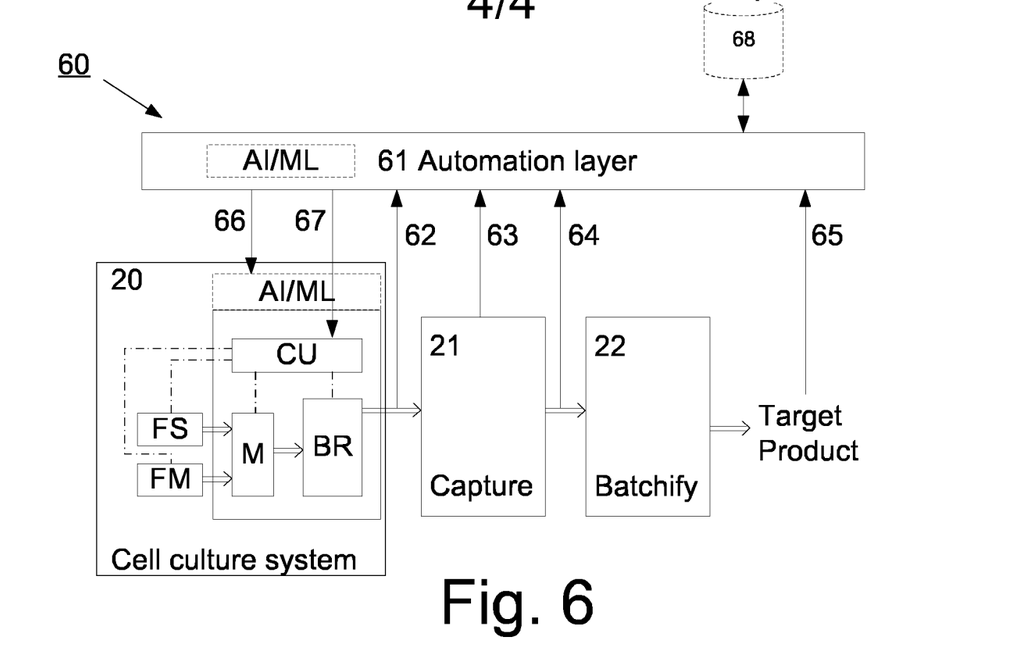
FIG. 6 illustrates an example embodiment of a bioprocess purification system.

FIG. 6 illustrates an example embodiment of a bioprocess purification system 60 with an automation layer 61, optionally comprising AI/ML (Artificial Intelligence/Machine Learning) functionality, a cell culture system 20, a capture step 21 and a batchify step 22. The cell culture system 20 comprises a bioreactor, BR, a mixer, M, a control unit, CU, and optionally AI/ML functionality. The control unit is configured to select feed material, FM, and feed supplement FS; and to control the mixer and the bioreactor. Quality attributes from a downstream process of the cell culture system are measured and monitored by the automation layer 61, as indicated by arrows 62-65, and processed to identify correlations between the measured quality attributes and parameters to control the cell culture system 20.

Many control options are available for influencing the continuous cell culture process. In order to be able to find suitable correlations between quality attributes downstream and control parameters for the bioreactor, in-line/at-line methods are used, which provides data with time intervals that allows for any type of feed-back control, assuming it is known which control parameters affect the specific quality attribute of the target product.

Examples of suitable sensors/equipment to measure parameters in a bioprocess purification system:
- Spectroscopic in combination with (very) advanced models for interpretation of information. To be integrated with feed-back functionality of reactor controlling system.
- At-line analytical probe that can convey molecules to be analyzed to an analytical system integrated with feed-back functionality of reactor controlling system.
- Advanced "soft sensing" models that from parameters that actually can be analyzed in-line (or is part of parameters setting) can conclude a likely quality profile of the product. These models are built outgoing from extensive off-line analytical work during process development, and information regarding correlations are stored within the automation layer, or in a separate database 68.

The database 68 may be used for aggregating data from earlier process runs and the AI/ML in the automation layer 61 is configured to learn and to apply actions more efficiently based on historic data in the database 68.

During product development of a new process to produce a product in a bioprocess purification system, a large amount of data is collected and the data needs to be analysed to identify important quality attributes of the product and to identify correlations between these quality attributes and control parameters in the cell culture process.

The quality attributes and correlations may be identified by feeding the bioreactor BR in its extremes to understand how control parameters affect quality attributes of the product and thereafter identify an operating window, within which the process is considered to produce a product with an acceptable quality. The operating window may naturally be adjusted to compensate for changes in quality requirements.

Different product quality attributes, how they are measured and control parameters used to cause impact are disclosed below.

A first example of product quality attributes is "Alternative glycosylation pattern". It may be measured using Liquid Chromatography-Mass Spectroscopy, LC-MS; MS-MS—at line, Raman Spectroscopy-in-line. Control parameters used to cause impact is: control metabolite concentration, control physical environment or supplement components.

Control metabolite concentrations may include:
- low glucose concentration (e.g. <1 mM)
- low glutamine concentration (e.g. <1 mM) ammonia concentration Control physical environment may include:
- range of dissolved oxygen (DO)
- pH range
- range of pCO2 (>100 mmHg).
- Process temperature (30° C.-32° C.)
- shear stress Supplement components may include:
- manganese supplement
- sodium butyrate
- dimethyl sulfoxide, DMSO
- Glycerol
- N-acetylmannosamine A second example of product quality attributes is "charged species" (Isoforms). It may be measured using cation ion exchange, CIEX, High Pressure LC, HPLC, MS and Biacore. Control parameters used to cause impact is: Temperature, Iron concentration, pH, perfusion rate, or glucose concentration.

A third example of product quality attributes is "aggregates" (high molecular spieces). It may be measured using Size Exclusion Chrom, SEC, Light Scattering in line (at line) and Biacore—at line. Control parameters used to cause impact is: Agitation, Temperature, perfusion rate, or Aeration.

A fourth example of product quality attributes is "fragments" (—low molecular spieces). It may be measured using SEC, MS and Biacore (measure protease level in flow through). Control parameters used to cause impact is: Agitation, Temperature, cell viability (avoid cell lysis) or protease inhibitors in feed before capture if allowed. Examples of protease inhibitors are ETDA (ethylenediaminetetraacetic acid), metal ions.

Other possible product quality attributes that could be of interest to measure is: Adducts (chemical additions) measured by MS, Amino acid substitution measured by MS or HPLC, Carbamylation (Amines react with isocyanic acid) measured by Peptide mapping (proteolytic enzyme cleavage), Deamidation (asparagine is transformed into aspartic acid) measured by High resolution ion exchange, IEX, Isoelectric focusing, Incorrect di-sulfide formation measured by sodium dodecyl sulfate-polyacrylamide gel electrophoresis, SDS-PAGE, Reversed Phase HPLC, RP-HPLC, MS (for trisulfides), N-terminal modifications, e.g. acetylation measured by MS, Oxidations e.g. Met oxidation measured by MS, Phosphorylation of e.g. Thr measured by MS, and hereditary coproporphyria, HCP, measured by enzyme-linked immunosorbent assay, ELISA, two-dimensional PAGE, 2D PAGE, SDS-PAGE.

The invention claimed is:

1. A method for controlling a bioprocess purification system comprising a continuous cell culture process in a bioreactor comprising cells capable of expressing a target product and a downstream purification process arranged downstream the continuous cell culture process and being configured for purification of harvest fluid from the continuous cell culture process to purify the target product from said harvest fluid, the method comprising:
    a) withdrawing harvest fluid from the continuous cell culture process;
    b) at least partly purifying the target product from the harvest fluid in the downstream purification process;
    c) detecting at least one quality attribute indicative of characteristics of the at least partly purified target product;
    d) identifying correlations between the at least one quality attribute measured in the downstream purification process and parameters to control the continuous cell culture process in the bioreactor; and
    e) controlling the continuous cell culture process to meet desired characteristics based on the identified correlations; whereby the target characteristics are within a pre-determined range; and wherein the downstream purification process comprises:
    i) a hold step comprising collecting a pre-determined volume or a pre-determined mass of the target product from the harvest fluid, whereby step ii) below starts when the pre-determined volume value is reached, or when the pre-determined mass is reached;
        ii) a capture step comprising a continuous chromatography process or a semi-continuous chromatography process;
        iii) a viral inactivation step comprising performing batch mode chromatography to filter the target product based on volume, time, temperature, and pH;
        iv) a polishing step comprising a straight through processing (STP) with a connected batch step or continuous chromatography with a continuous load step, or a combination thereof; and
        v) a delivery step comprising for subjecting the target product to an ultra-filtration step, prior to continuous or batch delivery of the target product, to further filter the target product based on pH, conductivity, absorbance, volume, and pressure.

2. The method according to claim 1, wherein step e) further comprises controlling a concentration of the target product in the harvest fluid being fed into the downstream purification process.

3. The method according to claim 1, wherein step e) further comprises controlling the cell culture process to adjust a composition of the harvest fluid being fed into the downstream purification process.

4. The method according to claim 1, wherein the continuous cell culture process is a perfusion type process and step e) further comprises controlling temperature and/or aeration and/or agitation.

5. The method according to claim 1, wherein step c) further comprises analyzing readings from at least one sensor arranged downstream the continuous cell culture process to obtain readings related to the quality attributes.

6. The method according to claim 5, wherein the step of analyzing readings from at least one sensor comprises using at least one analytic method selected from the group consisting of: Mass Spectroscopy, (MS), Light Scattering, Size Exclusion Chromatography, (SEC), and Rahman.

\* \* \* \* \*